US011891779B2

(12) United States Patent
Ogura et al.

(10) Patent No.: US 11,891,779 B2
(45) Date of Patent: Feb. 6, 2024

(54) HYDRAULIC EXCAVATOR

(71) Applicant: Hitachi Construction Machinery Co., Ltd., Tokyo (JP)

(72) Inventors: Kohei Ogura, Tsuchiura (JP); Katsuaki Kodaka, Tsukuba (JP); Masahiro Kayane, Tsuchiura (JP); Yoshihiro Shirakawa, Tsukuba (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 542 days.

(21) Appl. No.: 17/272,688

(22) PCT Filed: Dec. 12, 2019

(86) PCT No.: PCT/JP2019/048766

§ 371 (c)(1),
(2) Date: Mar. 2, 2021

(87) PCT Pub. No.: WO2020/188920

PCT Pub. Date: Sep. 24, 2020

(65) Prior Publication Data

US 2021/0348366 A1 Nov. 11, 2021

(30) Foreign Application Priority Data

Mar. 20, 2019 (JP) ................................ 2019-053782

(51) Int. Cl.
*E02F 9/22* (2006.01)
*E02F 3/32* (2006.01)
(Continued)

(52) U.S. Cl.
CPC .............. *E02F 9/2228* (2013.01); *E02F 3/32* (2013.01); *E02F 3/425* (2013.01); *E02F 9/2004* (2013.01);
(Continued)

(58) Field of Classification Search
CPC . E02F 3/32; E02F 3/425; E02F 3/2004; E02F 3/2228; E02F 3/2267; E02F 3/2271;
(Continued)

(56) References Cited

U.S. PATENT DOCUMENTS 5,083,428 A * 1/1992 Kubomoto ............ E02F 9/2239 60/486
5,493,950 A * 2/1996 Kim ...................... E02F 9/2221 60/494

(Continued)

FOREIGN PATENT DOCUMENTS

JP 58-146632 A 9/1983
JP 3-213703 A 9/1991

(Continued)

OTHER PUBLICATIONS

Korean-language Office Action issued in Korean Application No. 10-2021-7005263 dated Jul. 20, 2022 with (five (5) pages).

(Continued)

*Primary Examiner* — Saul Rodriguez
*Assistant Examiner* — Brendan P Tighe
(74) *Attorney, Agent, or Firm* — Crowell & Moring LLP

(57) ABSTRACT

A hydraulic excavator is provided which can suppress the fuel consumption amount and improve the work efficiency by reducing the hydraulic pressure loss generated when a plurality of hydraulic actuators different in load are operated simultaneously. The hydraulic excavator includes a center bypass flow control valve that is arranged at the most downstream of a center bypass line and limits the flow rate of hydraulic fluid passing through the center bypass line in response to the operation amount of the second operation device in a case where a second operation device is operated, and a spool stroke limitation device that, in a case where a first operation device and the second operation device are
(Continued)

operated simultaneously, limits the spool stroke amount of a second directional control valve in response to the operation amount of the first operation device in a state in which the spool stroke amount of a third directional control valve is controlled in response to the operation amount of the second operation device.

6 Claims, 10 Drawing Sheets

(51) Int. Cl.
*E02F 3/42* (2006.01)
*E02F 9/20* (2006.01)
*F15B 15/20* (2006.01)

(52) U.S. Cl.
CPC .......... *E02F 9/2267* (2013.01); *E02F 9/2271* (2013.01); *E02F 9/2285* (2013.01); *E02F 9/2292* (2013.01); *F15B 15/204* (2013.01); *E02F 9/2296* (2013.01)

(58) Field of Classification Search
CPC ..... E02F 3/2285; E02F 3/2292; E02F 3/2296; F15B 15/204
See application file for complete search history.

(56) References Cited

U.S. PATENT DOCUMENTS

| | | | | |
|---|---|---|---|---|
| 5,673,558 A * | 10/1997 | Sugiyama | E02F 9/2242 60/426 |
| 5,950,430 A * | 9/1999 | Tohji | F16H 61/4061 60/426 |
| 6,378,303 B1 * | 4/2002 | Higuchi | E02F 9/2285 60/468 |
| 8,607,557 B2 * | 12/2013 | Ikeda | E02F 9/2242 60/471 |
| 9,869,311 B2 * | 1/2018 | Du | F04B 49/002 |
| 9,903,097 B2 * | 2/2018 | Hashimoto | E02F 9/2282 |
| 9,932,994 B2 * | 4/2018 | Hashimoto | E02F 9/2282 |
| 10,253,479 B2 * | 4/2019 | Kaneta | E02F 9/2012 |
| 10,619,632 B2 * | 4/2020 | Kondo | E02F 9/2292 |
| 11,078,646 B2 * | 8/2021 | Kurokawa | E02F 9/22 |
| 11,346,081 B2 * | 5/2022 | Yamashita | E02F 9/2235 |
| 11,434,937 B2 * | 9/2022 | Misaki | E02F 9/2282 |
| 2007/0169474 A1 | 7/2007 | Oka et al. | |
| 2012/0067443 A1 * | 3/2012 | Horii | E02F 9/2292 137/599.01 |
| 2013/0160439 A1 | 6/2013 | Lee et al. | |
| 2015/0059331 A1 | 3/2015 | Hashimoto | |

FOREIGN PATENT DOCUMENTS

| | | | |
|---|---|---|---|
| JP | 7-119709 | A | 5/1995 |
| JP | 2007-192344 | A | 8/2007 |
| JP | 2010-47983 | A | 3/2010 |
| JP | 5219691 | B2 | 6/2013 |
| JP | 2013-543086 | A | 11/2013 |
| JP | 2014-1769 | A | 1/2014 |
| JP | 2015-36495 | A | 2/2015 |

OTHER PUBLICATIONS

International Preliminary Report on Patentability (PCT/IB/338 & PCT/IB/373) issued in PCT Application No. PCT/JP2019/048766 dated Sep. 30, 2021, including English translation of document C2 (Japanese-language Written Opinion (PCT/ISA/237) filed on Mar. 2, 2021) (five (5) pages).

International Search Report (PCT/ISA/210) issued in PCT Application No. PCT/JP2019/048766 dated Feb. 25, 2020 with English translation (five (5) pages).

Japanese-language Written Opinion (PCT/ISA/237) issued in PCT Application No. PCT/JP2019/048766 dated Feb. 25, 2020 (three (3) pages).

* cited by examiner

<COMPARATIVE EXAMPLE 1>

< COMPARATIVE EXAMPLE 2 >

HYDRAULIC EXCAVATOR

TECHNICAL FIELD

The present invention relates to a hydraulic excavator.

BACKGROUND ART

On a hydraulic excavator, there mounted are a boom, an arm, and a bucket, and a plurality of hydraulic actuators such as a boom cylinder, an arm cylinder and a bucket cylinder for driving those. Generally, since the number of hydraulic pumps that deliver hydraulic fluid for driving hydraulic actuators is smaller than that of hydraulic actuators, when a plurality of hydraulic actuators are simultaneously operated, it is necessary to appropriately distribute hydraulic fluid delivered from one hydraulic pump to the plurality of hydraulic actuators. As documents that disclose prior arts of such a hydraulic as described above, there are Patent Document 1 and Patent Document 2, for example.

The hydraulic circuit disclosed in Patent Document 1 is configured such that a restrictor is provided before a first arm directional control valve (arm second directional control valve) of a bypass line (parallel line) and even when operation such as horizontal drawing (composite operation of boom raising and arm crowding) in which the load pressure applied to the arm cylinder is lower than that applied to the boom cylinder is performed, the flow of hydraulic fluid to flow into the first arm directional control valve (arm second directional control value) is restricted and hydraulic fluid flows preferentially to the first boom directional control valve (boom first directional control valve).

In the hydraulic circuit disclosed in Patent Document 1 configured in this manner, even when the boom raising operation is gradually decreased to reduce the hydraulic fluid to flow into the boom cylinder in the horizontal drawing operation, the flow rate of hydraulic fluid flowing into the arm cylinder through the bypass line (parallel line) remains restricted by the restrictor. Therefore, there has been a possibility that hydraulic pressure loss generated at the restrictor may cause deterioration of the work efficiency or increase in fuel consumption amount.

On the other hand, the hydraulic circuit disclosed in Patent Document 2 has been invented in order to solve the problem of the hydraulic circuit disclosed in Patent Document 1. In the hydraulic circuit, the restrictor of the bypass line (parallel line) in the hydraulic circuit disclosed in Patent Document 1 is removed, and instead, a solenoid proportional pressure reducing valve is provided in front of an arm two-speed selector valve (arm second directional control valve) and an arm operation lever (arm pilot valve). The arm two-speed selector valve (arm second directional control valve) is used like a variable opening restrictor to reduce the hydraulic pressure loss generated upon horizontal drawing operation.

PRIOR ART DOCUMENT

Patent Documents

Patent Document 1: JP-1983-146632-A
Patent Document 2: Japanese patent No. 5219691

SUMMARY OF THE INVENTION

Problem to be Solved by the Invention

In the hydraulic circuit disclosed in Patent Document 1, even when the boom raising operation is gradually decreased to reduce the hydraulic fluid that flows into the boom cylinder in horizontal drawing operation, since the flow rate of hydraulic fluid that flows into the arm cylinder through the bypass line (parallel line) remains restricted by the restrictor, there has been a possibility that the hydraulic pressure loss generated at the restrictor may cause deterioration of the work efficiency or increase in fuel consumption amount.

On the other hand, in the hydraulic circuit disclosed in Patent Document 2, since the spool stroke amount of the arm two-speed selector valve (arm second directional control valve) is limited to a fixed amount, even when the arm crowding operation is gradually increased during horizontal drawing operation, the center bypass opening of the arm two-speed selector valve (arm second directional control valve) does not close fully. Accordingly, the amount of hydraulic fluid that flows from the arm two-speed selector valve (arm second directional control valve) into the arm cylinder does not increase. In other words, in the hydraulic circuit disclosed in Patent Document 2, hydraulic fluid delivered from the hydraulic pump cannot be fully used effectively, and there is a problem that the hydraulic circuit disclosed in Patent Document 2 is inferior to the hydraulic circuit disclosed in Patent Document 1 in terms of the arm crowding speed upon horizontal drawing maximum operation.

The present invention has been made in view of the subject described above, and it is an object of the present invention to provide a hydraulic excavator that can suppress the fuel consumption amount and improve the work efficiency by reducing the hydraulic pressure loss generated when a plurality of hydraulic actuators different in load are simultaneously operated simultaneously.

Means for Solving the Problem

In order to achieve the object described above, according to the present invention, there is provided a hydraulic excavator that includes a main body configured from an upper swing structure and a lower track structure; a boom pivotably coupled to the main body; an arm pivotably coupled to a distal end portion of the boom; a bucket pivotably coupled to a distal end portion of the arm; a first hydraulic pump; a second hydraulic pump; a boom cylinder or a bucket cylinder to which hydraulic fluid is supplied from the first hydraulic pump and the second hydraulic pump to drive the boom or the bucket; an arm cylinder to which hydraulic fluid is supplied from the first hydraulic pump to drive the arm; a first operation device that issues an instruction on operation of the boom cylinder or the bucket cylinder; a second operation device that issues an instruction on operation of the arm cylinder; a first directional control valve that controls a direction and a flow rate of hydraulic fluid to be supplied from the first hydraulic pump to the boom cylinder or the bucket cylinder in response to an operation amount of the first operation device; a second directional control valve that controls a direction and a flow rate of hydraulic fluid to be supplied from the first hydraulic pump to the arm cylinder in response to an operation amount of the second operation device; and a third directional control valve that controls a direction and a flow rate of hydraulic fluid to be supplied from the second hydraulic pump to the arm cylinder in response to an operation amount of the second operation device, the first directional control valve and the second directional control valve being tandem connected to a center bypass line of the first hydraulic pump and being connected in parallel to a parallel line branched from the center bypass line, the hydraulic excavator including a center bypass flow control valve that is arranged at a most downstream of the center bypass line and limits a flow rate of hydraulic fluid passing through the center bypass line in response to an operation amount of the second operation device when the second operation device is operated, and a spool stroke limitation device that is configured to, in a case where the first operation device and the second operation device are operated simultaneously, limit a spool stroke amount of the second directional control valve in response to an operation amount of the first operation device in a state in which a spool stroke amount of the third directional control valve is controlled in response to an operation amount of the second operation device.

According to the present invention configured in such a manner as described above, the flow rate passing through the center bypass line from the first hydraulic pump is restricted in response to the operation amount of the second operation device when the second operation device is operated, and when the first operation device and the second operation device are operated simultaneously, in a state in which the spool stroke amount of the third directional control valve is controlled in response to the operation amount of the second operation device, the spool stroke amount of the second directional control valve is restricted in response to the operation amount of the first operation device. Therefore, the hydraulic pressure loss generated when the plurality of hydraulic actuators different in load are operated simultaneously is reduced, and consequently, the fuel consumption can be suppressed and besides the work efficient can be improved.

Advantages of the Invention

According to the present invention, the fuel consumption amount can be suppressed and besides the work efficiency can be improved by reducing the hydraulic pressure loss generated when a plurality of hydraulic actuators different in load are simultaneously operated.

MODES FOR CARRYING OUT THE INVENTION

Figure 1:
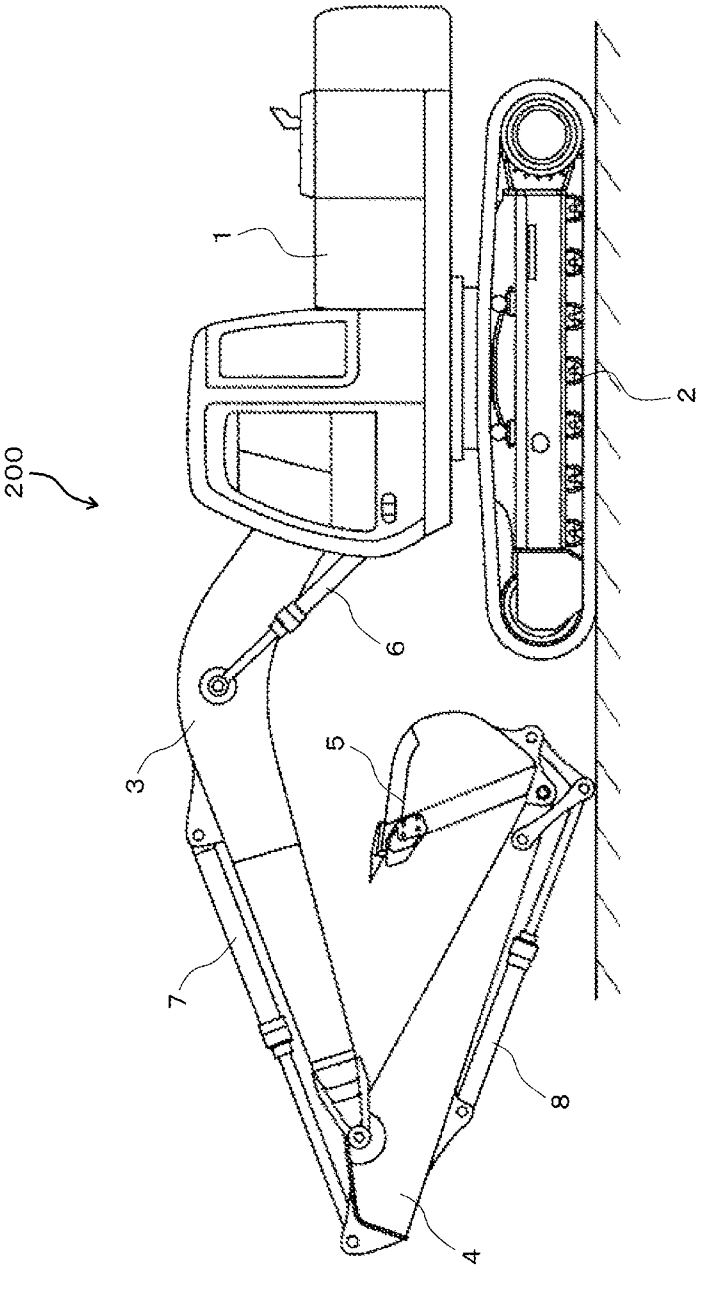
FIG. 1 is a side elevational view depicting a hydraulic excavator according to a first embodiment of the present invention.

In the following, a hydraulic excavator according to an embodiment of the present invention is described with reference to the drawings. It is to be noted that, in the figures, an equivalent member is denoted by a like reference character and overlapping description is suitably omitted.

Embodiment 1

In the following, a first embodiment of the present invention is described with reference to FIGS. 1 to 8.

FIG. 1 is a side elevational view depicting a hydraulic excavator according to the present embodiment. Referring to FIG. 1, the hydraulic excavator 200 includes a lower track structure 2 and an upper swing structure 1 swingably connected to the lower track structure 2, and there mounted on the hydraulic excavator 200 are a boom 3, an arm 4, and a bucket 5, and hydraulic cylinders such as a boom cylinder 6, an arm cylinder 7 and a bucket cylinder 8 for driving those.

Figure 2:
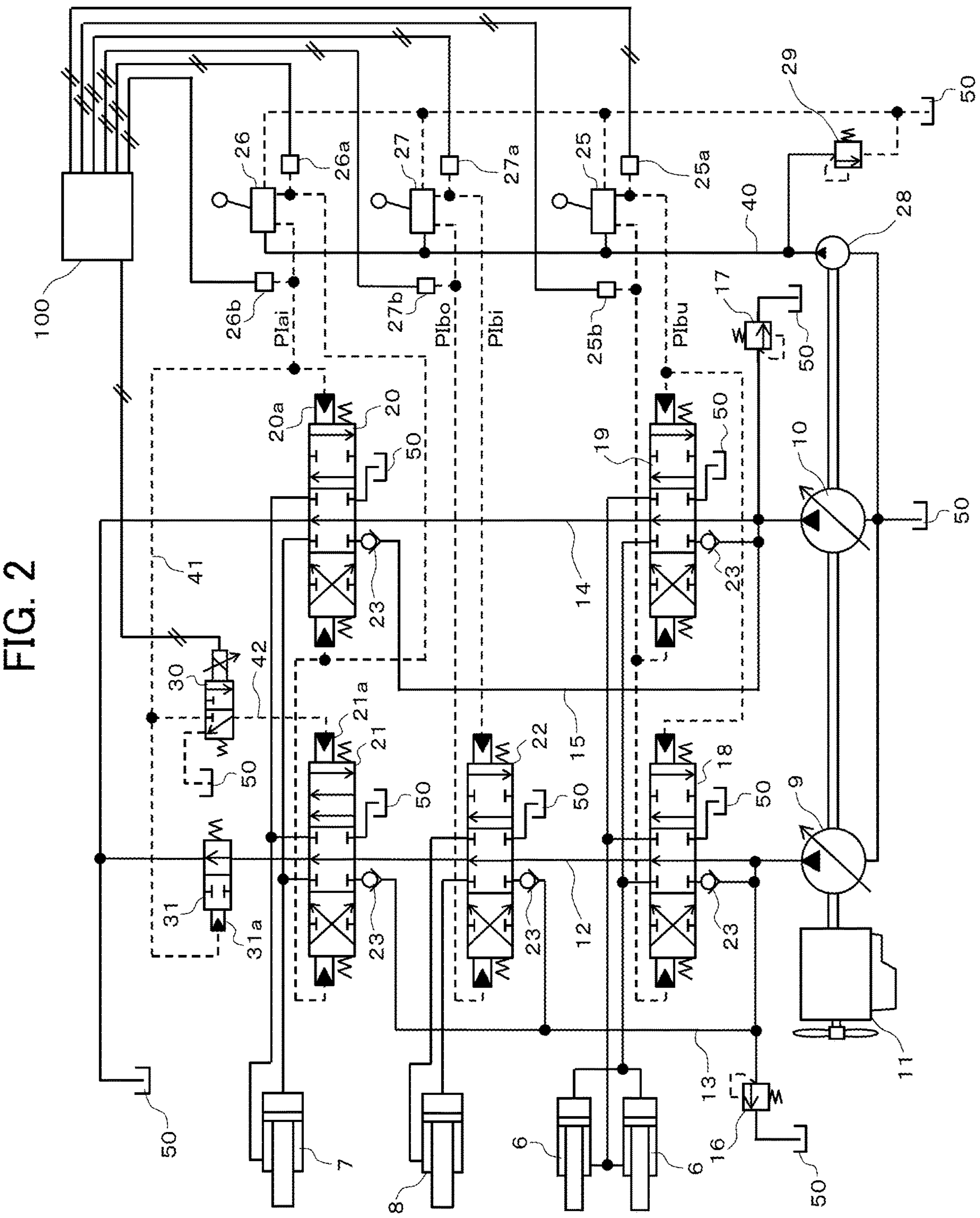
FIG. 2 is a hydraulic circuit diagram of the hydraulic excavator according to the first embodiment of the present invention.

FIG. 2 is a hydraulic circuit diagram of the hydraulic excavator 200. In the present embodiment, a hydraulic circuit of the positive control type is taken as an example. Referring to FIG. 2, hydraulic pumps 9 and 10 of the variable displacement type are driven by an engine 11. The first hydraulic pump 9 supplies pressure fluid to a boom first directional control valve 18, a bucket directional control valve 22, and an arm second directional control valve 21. The directional control valves 18, 22, and 21 are tandem connected to each other by a center bypass line 12 of the first hydraulic pump 9 and besides are connected in parallel to each other by a parallel line 13 branched from the center bypass line 12. The second hydraulic pump 10 supplies hydraulic fluid to a boom second directional control valve 19 and an arm first directional control valve 20. The directional control valves 19 and 20 are tandem connected to each other by a center bypass line 14 of the second hydraulic pump 10 and besides are connected in parallel to each other by a parallel line 15 branched from the center bypass line 14. The center bypass lines 12 and 14 are connected to a hydraulic working fluid tank 50 at the most downstream and can suppress the pump load low by discharging hydraulic working fluid delivered from the hydraulic pumps 9 and 10 when the hydraulic actuators 6 to 8 are not operated. A check valve 23 is provided between the directional control valves 18 to 22 and the parallel lines 13 and 15 and prevents pressure fluid from flowing back from the hydraulic cylinders to the parallel lines. Relief valves 16 and 17 are connected to the parallel lines 13 and 15 and prevent the pressure in the hydraulic circuit from becoming excessively high to damage the hydraulic equipment.

The directional control valves 18 to 22 are tandem center type spool valves and are operated by secondary pressures outputted from the pilot valves 25 to 27. The pilot valves 25 to 27 are manual pressure reducing valves, and reduces the pressure of pressure fluid delivered from a pilot pump 28 of the fixed capacity type, which is driven by the upper swing structure 1, in response to a lever operation amount and output the reduced pressures as secondary pressures. Further, in a delivery line 40 of the pilot pump 28, a pilot relief valve 29 is provided such that the pressure of the delivery line 40 is kept fixed. On a hydraulic line that connects the secondary pressure ports of the pilot valves 25 to 27 to the operation pressure ports of the directional control valves 18 to 22, pressure sensors 25*a*, 25*b*, 26*a*, 26*b*, 27*a*, and 27*b* are provided such that the secondary pressure of each of the pilot valves can be detected.

At the most downstream of the center bypass line 12, a center bypass flow control valve 31 is provided. An operation pressure port 31*a* of the center bypass flow control valve 31 is connected to a second pressure port on the arm crowding side of the arm pilot valve 26 through a pilot line 41. Consequently, a secondary pressure on the arm crowding side of the arm pilot valve 26 acts on the operation pressure port 31*a* of the center bypass flow control valve 31. An operation pressure port 21*a* on the arm crowding side of the arm second directional control valve 21 is connected to a secondary pressure port of the solenoid proportional pressure reducing valve 30 through a pilot line 42. A primary pressure port of the solenoid proportional pressure reducing valve 30 is connected to a secondary pressure port on the arm crowding side of the arm pilot valve 26 through the pilot line 41. The operation pressure to act on the operation pressure port 21*a* can be controlled by the solenoid proportional pressure reducing valve 30.

The pressure sensors 25*a*, 25*b*, 26*a*, 26*b*, 27*a*, and 27*b* and the solenoid proportional pressure reducing valve 30 are connected to a controller 100, and the controller 100 controls the secondary pressure of the solenoid proportional pressure reducing valve 30 on the basis of operation pressures detected by the pressure sensors 25*a*, 25*b*, 26*a*, 26*b*, 27*a*, and 27*b*.

Figure 4:
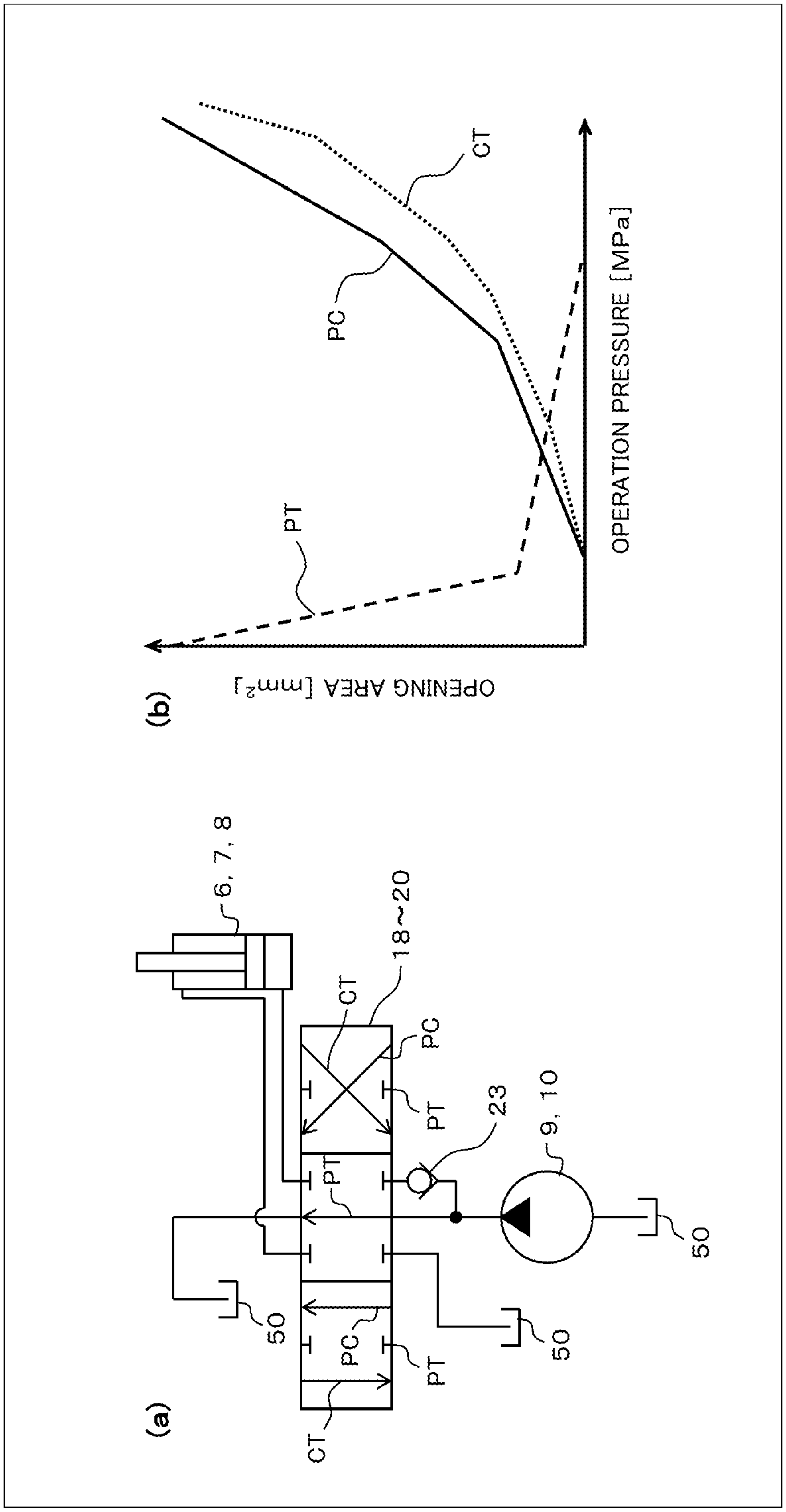
FIG. 4 is a view depicting an opening characteristic of a directional control valve.

FIG. 4 depicts an opening characteristic of the directional control valves 18 to 22. As depicted in FIG. 4(*a*), the directional control valves 18 to 22 are 6-port 3-position spool valves and have three openings including a meter-in opening (PC), a meter-out opening (CT) and a center bypass opening (PT). The openings PC, CT, and PT have such characteristics as depicted in FIG. 4(*b*) and can control such that hydraulic fluid of optimum flow rates flow into the hydraulic cylinders 6 to 8 in response to the operation pressures outputted from the pilot valves 25 to 27 in response to a lever operation amount.

Figure 5:
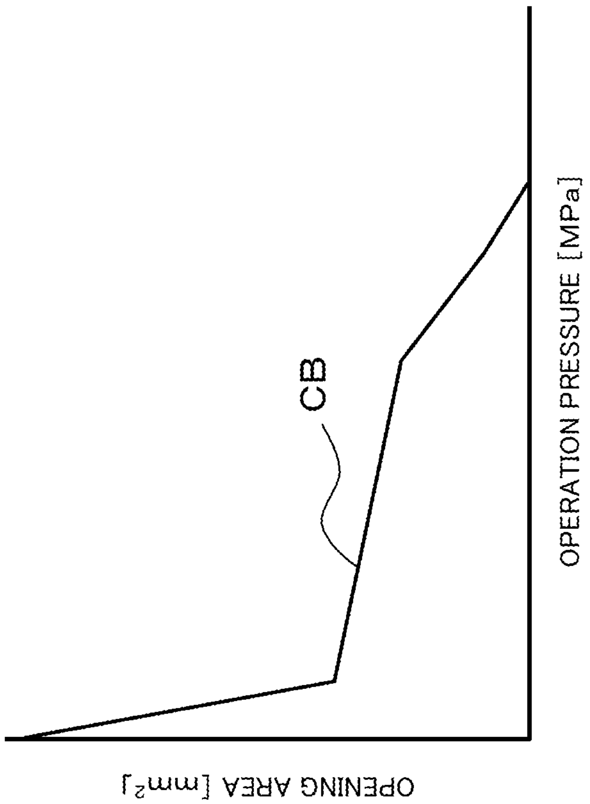
FIG. 5 is a view depicting an opening characteristic of a center bypass flow control valve.

FIG. 5 depicts an opening characteristic of the center bypass flow control valve 31. An opening characteristic CB of the center bypass flow control valve 31 has a characteristic similar to that of the PT opening at the time of arm crowding operation of the arm second directional control valve 21 in the prior art (depicted in FIG. 9) and specifies such that, as the operation pressure increases, the opening area of the center bypass flow control valve 31 decreases. More particularly, in a region in which the operation pressure is low, the opening area is restricted to approximately one half from a maximum opening area and, in a region in which the pressure is high in comparison with that, the opening area gradually decreases as the operation pressure increases.

Operation of the controller 100 is described with reference to FIGS. 6 to 8.

Figure 6:
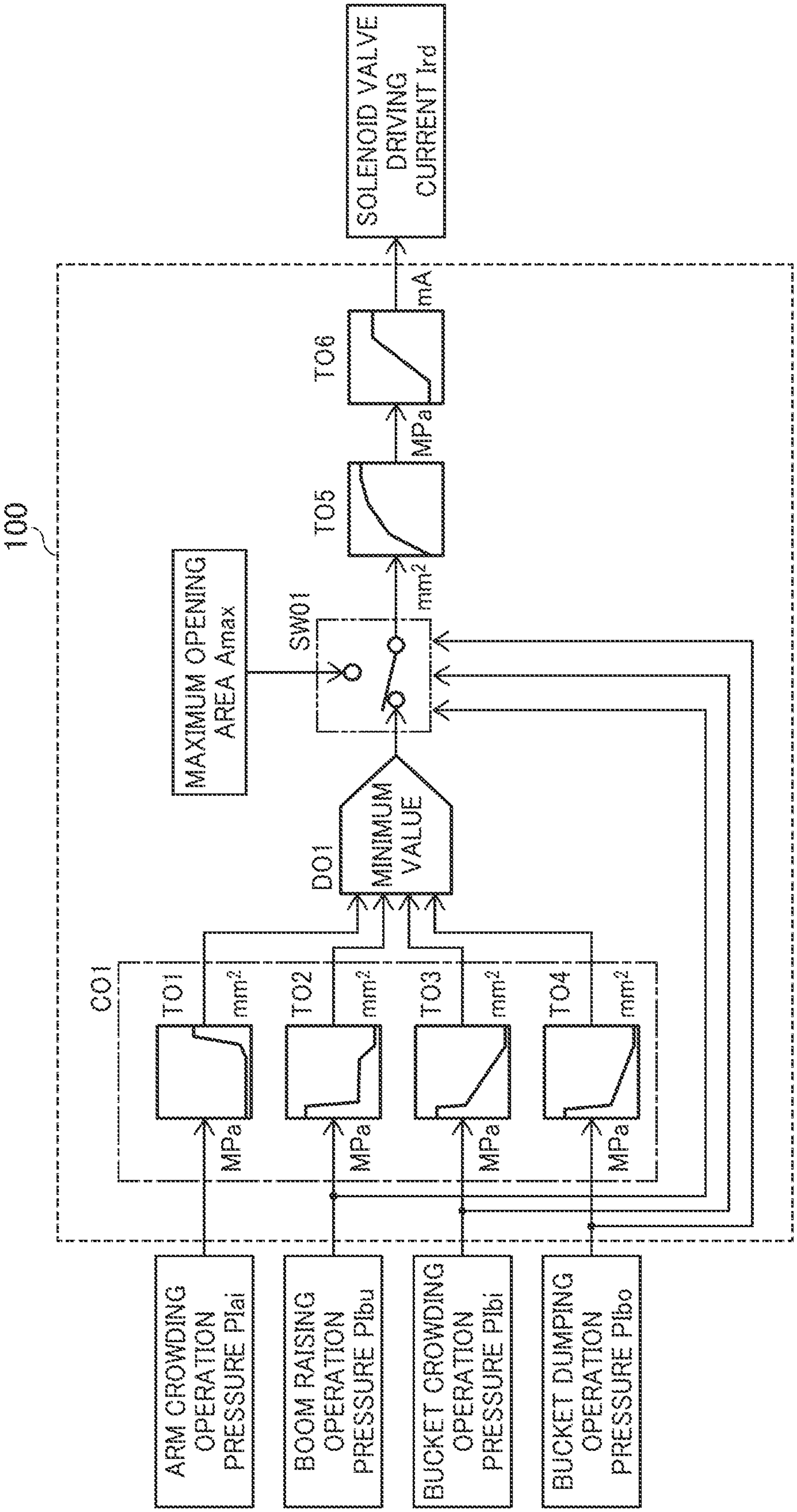
FIG. 6 is a block diagram depicting instruction value calculation of a solenoid proportional pressure reducing valve by a controller.

FIG. 6 is a block diagram depicting instruction value calculation for the solenoid proportional pressure reducing valve 30 by the controller 100. Referring to FIG. 6, the controller 100 includes an opening area calculation section C01 that calculates a target meter-in opening (PC) area of the arm second directional control valve 21, a minimum value selection section D01 that selects a minimum one of opening areas calculated by the opening area calculation section C01, and an operation decision section SW01 that decides whether operation for one of boom raising, bucket crowding and bucket dumping has been carried out.

The opening area calculation section C01 calculates the target meter-in opening (PC) area of the arm second directional control valve 21 according to individual operation pressures using conversion tables T01 to T04 corresponding to the arm crowding operation pressure PIai, the boom raising operation pressure PIbu, the bucket crowding operation pressure PIbi, and the bucket dumping operation pressure PIbo, respectively.

Figure 7:
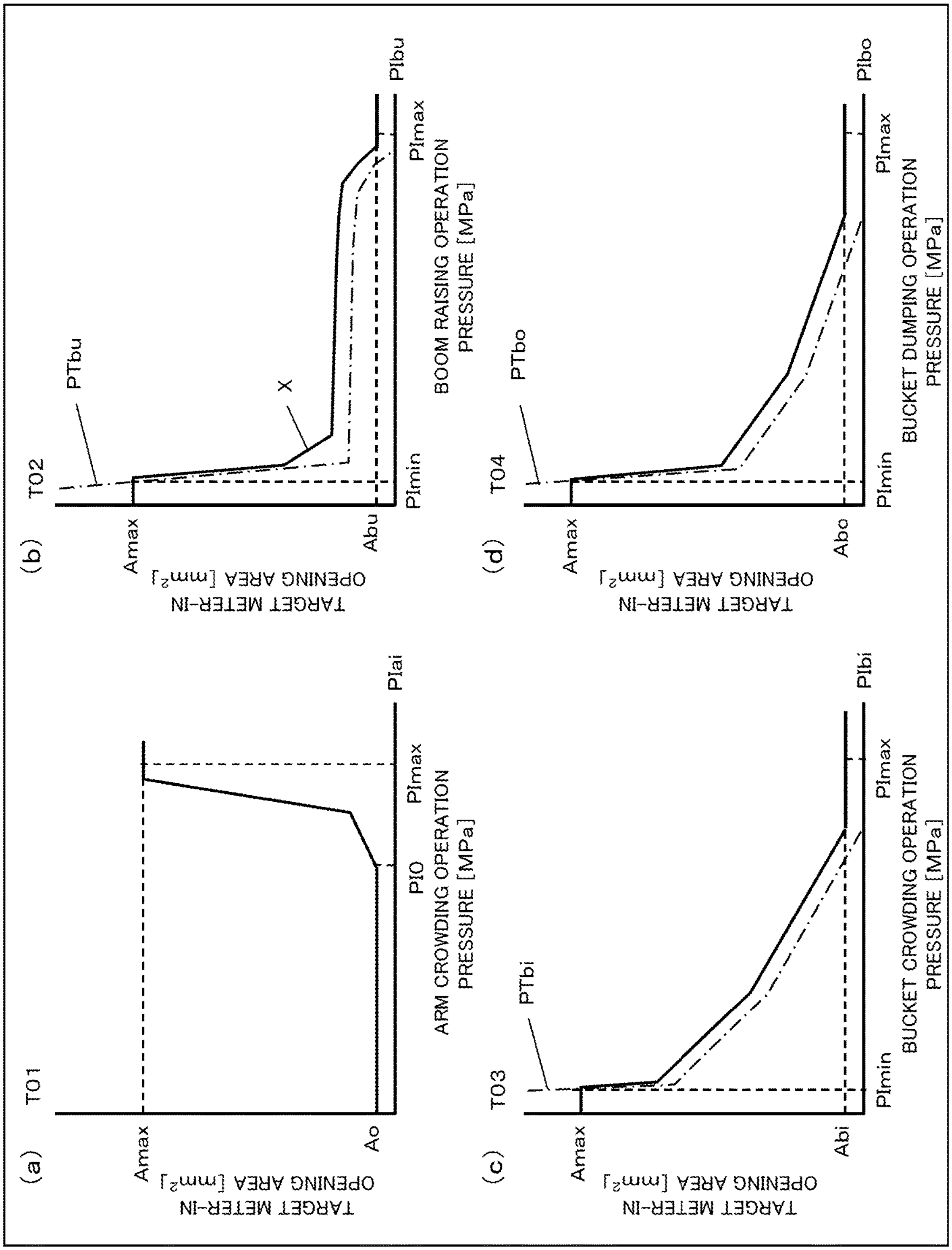
FIG. 7 is a view depicting a conversion table used for calculation of a target meter-in opening area of an arm second directional control valve.

FIG. 7 is a view depicting conversion tables that are used for calculation of the target meter-in opening area of the arm second directional control valve 21.

FIG. 7(*a*) depicts a characteristic of the conversion table T01. In the conversion table T01, the opening area has such a characteristic that it is a fixed opening area Ao until the arm crowding operation pressure PIai changes to a fixed value (PI0), and after the arm crowding operation pressure PIai exceeds the fixed value PI0, the opening area gradually increases until it becomes a maximum opening area Amax when the arm crowding operation pressure PIai reaches a maximum operation pressure PImax. It is to be noted that a boom raising characteristic similar to that in the prior art can be obtained, for example, by setting the opening area Ao to the same opening area as that of a restrictor 24 depicted in the prior art (depicted in FIG. 9).

FIG. 7(*b*) depicts a characteristic of the conversion table T02. Referring to FIG. 7(*b*), a curve indicated by a solid line indicates a characteristic of the conversion table T02, and a curve (PTbu) indicated by a dashed line indicates a center bypass opening (PT) characteristic on the boom raising side of the boom first directional control valve 18. In the conversion table T02, the opening area is the maximum opening area Amax in a region of the boom raising operation pressure PIbu equal to or lower than the fixed value (PImin), and after the boom raising operation pressure PIbu gradually increases and exceeds the fixed value PImin, the opening area decreases. After an inclination portion X is passed, the opening area is greater than the opening area on the curve PTbu by a minimum value Abu of the target meter-in opening area. It is to be noted that the shape of the inclination portion X is determined in response to the meter-in opening (PC) characteristic on the boom raising side of the boom first directional control valve 18 and may be a curved line. If the boom raising operation pressure PIbu increases further until it reaches the maximum operation pressure PImax, it becomes fixed at the minimum value Abu.

A characteristic of the conversion table T03 is depicted in FIG. 7(*c*). In FIG. 7(*c*), a curve indicated by a solid line indicates a characteristic of the conversion table T03, and a curve (PTbi) indicated by a dashed line indicates a center bypass opening (PT) characteristic on the bucket crowding side of the bucket directional control valve 22. Further, in the conversion table T03, the opening area is the maximum opening area Amax in a region of the bucket crowding operation pressure PIbi equal to or lower than a fixed value (PImin), and after the bucket crowding operation pressure PIbi increases and exceeds the fixed value PImin, the opening area decreases to an opening area that is greater by a minimum value Abi of the target meter-in opening area than the opening area on the curve PTbi. Further, after the bucket crowding operation pressure PIbi increases and reaches the maximum operation pressure PImax, it becomes fixed at the minimum value Abi.

FIG. 7(*d*) depicts a characteristic of the conversion table T04. In FIG. 7(*d*), a curve indicated by a solid line indicates a characteristic of the conversion table T04, and a curve (PTbo) indicated by a dashed line indicates a center bypass opening (PT) characteristic on the bucket dumping side of the bucket directional control valve 22. In the conversion table T04, the opening area is the maximum opening Amax within a region of the bucket dumping operation pressure PIbo equal to or lower than the fixed value (PImin), and after the bucket dumping operation pressure PIbo increases and exceeds the fixed value PImin, the opening area decreases and becomes an opening area that is greater by a minimum value Abo of the target meter-in opening than the opening area on the curve PTbo. Further, after the bucket dumping operation pressure PIbo increases and reaches the maximum operation pressure PImax, the opening area becomes fixed at the minimum value Abo. It is to be noted that the minimum values Abu, Abi, and Abo of the target meter-in opening area in the tables T02 to T04 may be set to a value equal to the minimum value Ao of the target meter-in opening area in the conversion table 101 or may be set to a different value.

Referring back to FIG. 6, when one of the boom raising operation pressure PIbu, the bucket crowding operation pressure PIbi, and the bucket dumping operation pressure PIbo is equal to or higher than a decision value PIth, the operation decision section SW01 outputs an output value of the minimum value selection section D01, but where all of the boom raising operation pressure PIbu, the bucket crowding operation pressure PIbi, and the bucket dumping operation pressure PIbo are lower than the decision value PIth, the operation decision section SW01 outputs the maximum opening area Amax. The max opening area Amax is set to a value equal to or greater than the maximum opening area of the PC opening characteristic at the time of arm crowding operation of the arm second directional control valve 21.

A conversion table T05 calculates a target value of the secondary pressure of the solenoid proportional pressure reducing valve 30 corresponding to the opening area outputted from the operation decision section D01. The characteristic of the conversion table T05 is a characteristic in which the axis of ordinate and the axis of abscissa of the meter-in opening (PC) characteristic at the time of arm crowding operation of the arm second directional control valve 21. A conversion table T06 calculates driving current Ird of the solenoid proportional pressure reducing valve 30 corresponding to the target pressure outputted from the conversion table T05 and outputs the driving current Ird to the solenoid proportional pressure reducing valve 30. The characteristic of the conversion table T06 is a characteristic in which the axis of ordinate and the axis of abscissa of the current-pressure characteristic of the solenoid proportional pressure reducing valve 30 are exchanged.

Figure 8:
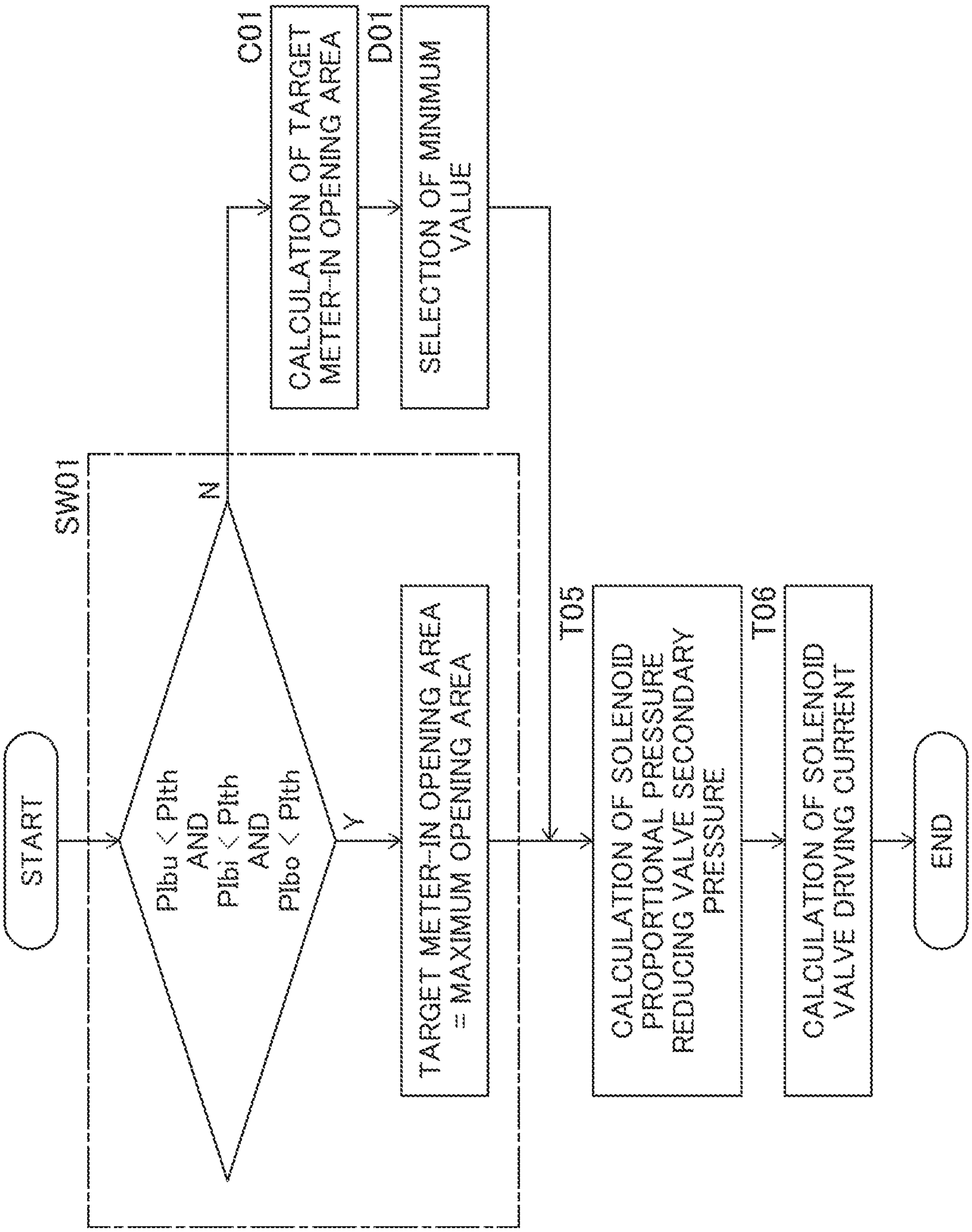
FIG. 8 is a view depicting a calculation flow of an instruction value of the solenoid proportional pressure reducing valve by the controller.

FIG. 8 is a view depicting a calculation flow of an instruction value of the solenoid proportional pressure reducing valve 30 by the controller 100 and depicts the calculation block diagram of FIG. 6 in the form of a flow chart. Since the individual calculations are described hereinabove with reference to FIG. 6, description of them is omitted.

Actual operation of the present embodiment configured in such a manner as described above is described in regard to several scenes.

<Where Arm Crowding Independent Operation is Performed>

If the operator operates the arm pilot valve 26 in an arm crowding direction, then arm crowding operation pressure PIai according to the operation amount is outputted from the arm crowding side secondary pressure port of the arm pilot valve 26. The arm crowding operation pressure PIai acts on an operation pressure port 20*a* on the arm crowding side of the arm first directional control valve 20, the operation pressure port 31*a* of the center bypass flow control valve 31 and the primary pressure port of the solenoid proportional pressure reducing valve 30, and the pressure is detected by the pressure sensor 26*b* and inputted to the controller 100. At this time, all of the boom raising operation pressure PIbu, the bucket crowding operation pressure PIbi, and the bucket dumping operation pressure PIbo are zero and are lower than PIth, and therefore, the controller 100 outputs, at SW01, the maximum opening area Amax. Accordingly, the target value of the secondary pressure of the solenoid proportional pressure reducing valve 30 calculated by the conversion table T05 becomes equal to the operation pressure at the maximum stroke of the arm second directional control valve 21, and therefore, the stroke amount of the arm second directional control valve 21 is not limited.

As a result, all of the arm first directional control valve 20, arm second directional control valve 21, and center bypass flow control valve 31 perform a stroke in response to the arm crowding operation pressure PIai, and therefore, hydraulic fluid delivered from the hydraulic pumps 9 and 10 passes through the arm first directional control valve 20 and the arm second directional control valve 21 and flows into the arm cylinder 7. Consequently, in the case of arm crowding independent operation, the stroke amount of the arm second directional control valve 21 is not limited and the arm 4 operates in accordance with the lever operation.

<Where Horizontal Drawing Operation is Performed (Maximum Speed)>

When horizontal drawing operation is to be performed at a maximum speed, the operator first operates the boom pilot valve 25 and the arm pilot valve 26 maximally, and thereafter, while the arm pilot valve 26 is kept in the maximum operation, the operation amount of the boom pilot valve 25 is gradually decreased such that the claw tip of the bucket 5 moves along the ground. At this time, the boom raising operation pressure PIbu outputted from the boom pilot valve 25 acts on the directional control valves 18 and 19 for the boom, and the arm crowding operation pressure PIai outputted from the arm pilot valve 26 acts on the operation pressure port 20*a* of the arm first directional control valve 20, the primary pressure port of the solenoid proportional pressure reducing valve 30, and the operation pressure port 31*a* of the center bypass flow control valve 31.

The controller 100 decides that a boom raising operation is performed by the operation decision section SW01 and executes a process of the opening area calculation section C01. In the conversion table T01 of the opening area calculation section C01, the arm crowding operation pressure PIai is the maximum operation pressure PImax, and therefore, the conversion table T01 outputs the maximum opening area Amax. In the conversion table T02, since the boom raising operation pressure PIbu varies from the maximum operation pressure PImax down to zero, the opening area A according to the boom raising operation pressure PIbu is outputted. In the conversion tables T03 and T04, both of the bucket crowding operation pressure PIbi and the bucket dumping operation pressure PIbo are zero (lower than PImin), and therefore, both of the conversion tables T03 and T04 output the maximum opening area Amax. Since all of the outputs of the conversion tables T01, T03, and T04 are the maximum opening area Amax at the minimum value selection section D01, the output of the conversion table T02 is outputted normally at the minimum value selection section D01. Accordingly, the secondary pressure of the solenoid proportional pressure reducing valve 30 is controlled such that the arm crowding side meter-in opening (PC) of the arm second directional control valve 21 becomes the opening area outputted from the conversion table T02.

When horizontal drawing operation is to be performed at a maximum speed, the arm crowding operation pressure PIai is operated fixedly with the maximum operation pressure PImax, and the boom raising operation pressure PIbu gradually decreases after it is operated to the maximum operation amount PImax at the time of starting of horizontal drawing. Then, at the point at which the arm 4 becomes vertical with respect to the ground, the operation lever (arm pilot valve 26) is operated to the neutral, whereupon the boom raising operation pressure PIbu becomes zero. At this time, the directional control valves 18 and 19 operate in accordance with the boom raising operation amount PIbu, and the arm first directional control valve 20 and the center bypass flow control valve 31 are placed into a maximum stroke state. Further, the arm crowding side meter-in opening (PC) of the arm second directional control valve 21 is the opening area Abu at the time of starting of horizontal drawing, and it gradually increases from this as the boom raising operation pressure PIbu decreases. Then, if the operation lever (arm pilot valve 26) is operated to the neutral and the boom raising operation pressure PIbu becomes zero at the point at which the arm 4 becomes vertical with respect to the ground, then the opening area becomes the maximum opening area (without any limit to the spool stroke amount).

As a result, almost all of hydraulic fluid delivered from the first hydraulic pump 9 flows into the boom cylinder 6 at the time of starting of horizontal drawing. However, after the middle stage of the horizontal drawing, as the boom raising operation amount PIbu decreases, the flow amount of the hydraulic fluid that flows into the arm cylinder 7 gradually increases. Then, when the boom raising operation amount PIbu decreases to zero at the end of the horizontal drawing, the hydraulic fluid flows by the whole amount into the arm cylinder 7. Meanwhile, hydraulic fluid delivered from the second hydraulic pump 10 flows by an almost whole amount into the arm cylinder 7 because the load pressure applied to the arm cylinder 7 is lower than the load pressure applied to the boom cylinder 6.

By such operation as described above, hydraulic fluid is supplied preferentially to the boom cylinder 6 to secure a boom raising speed at the time of starting of horizontal drawing, and at the middle stage of the horizontal drawing, the flow rate of hydraulic pressure that flows into the arm cylinder 7 is increased smoothly in response to decrease in the boom raising operation amount. Then at the last stage of the horizontal drawing, when the boom raising operation is ended, sudden increase in the arm speed is suppressed by the inclination portion X of the conversion table T02 and the arm speed can be increased smoothly. Consequently, the hydraulic pressure loss generated by the restrictor can be reduced together with improvement of the work efficiency upon horizontal drawing.

<Where Horizontal Drawing Operation is Performed (Intermediate Speed)>

Where horizontal drawing is performed at an intermediate speed, only the arm crowding operation pressure PIai is different in comparison with the case in which horizontal drawing is performed at a maximum speed. Here, if it is assumed that the arm crowding operation pressure PIai when horizontal drawing is performed at an intermediate speed is equal to or lower than PI0 of FIG. 7(*a*), since the opening area A outputted from the conversion table 101 becomes Ao, the arm crowding side meter-in opening (PC) area of the arm second directional control valve 21 is limited at most to Ao.

As a result, when horizontal drawing operation is performed at an intermediate speed, hydraulic fluid delivered from the first hydraulic pump 9 almost flows into the boom cylinder 6 while hydraulic fluid delivered from the second hydraulic pump 10 almost flows into the arm cylinder 7. Consequently, where horizontal drawing is performed at an intermediate speed, hydraulic fluid is supplied preferentially to the boom cylinder, and good workability can be implemented.

<Where Arm Crowding and Bucket Crowding or Bucket Dumping are Performed Simultaneously>

Where arm crowding and bucket crowding or bucket dumping are performed simultaneously, since boom raising operation in the operation at the time of horizontal drawing described above is only replaced with bucket crowding or bucket dumping operation, description of that is omitted.

In the following, advantageous effects achieved by the hydraulic excavator 200 according to the present embodiment are described in comparison with those by the prior art.

Figure 9:
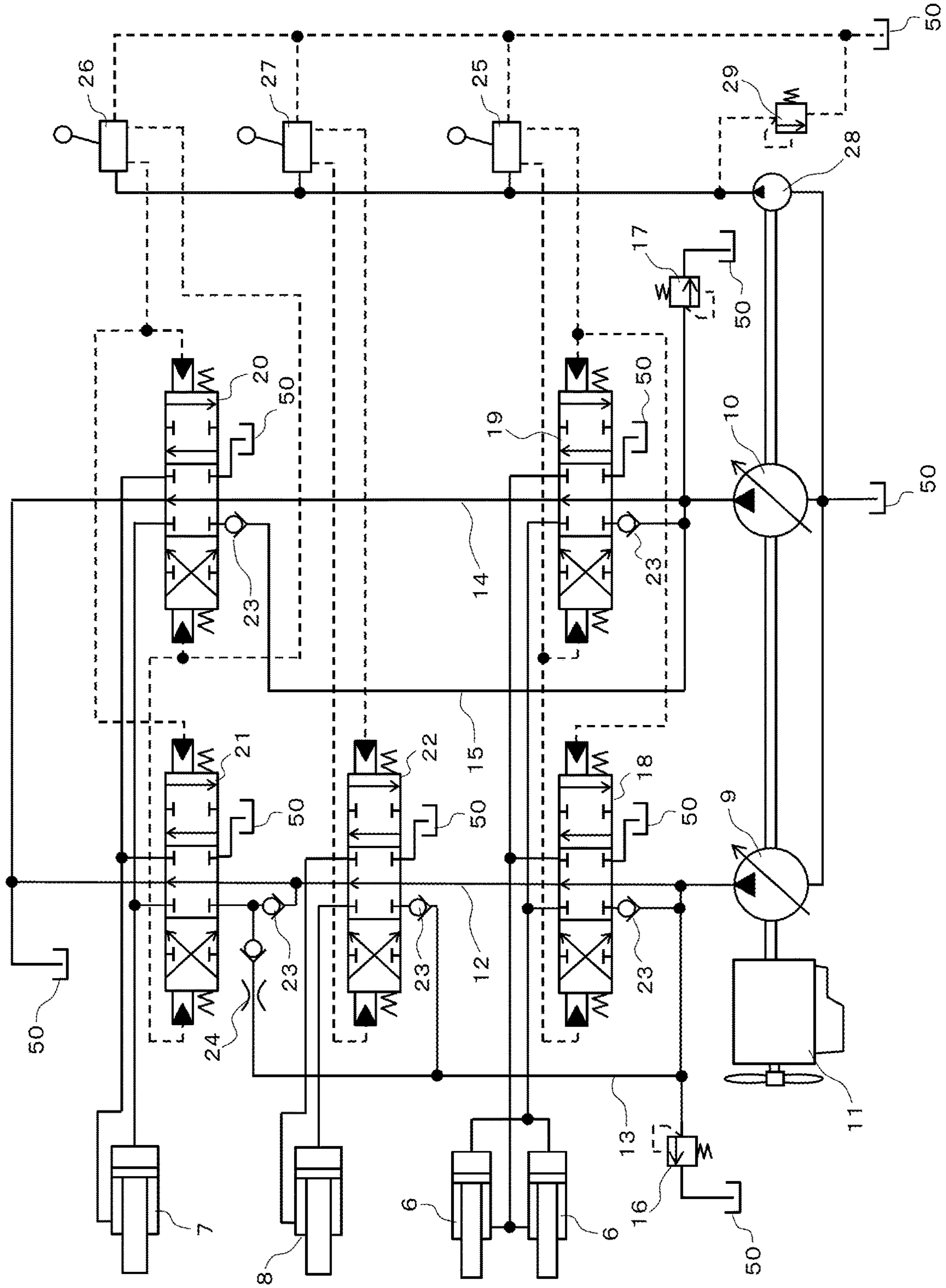
FIG. 9 is a view depicting a hydraulic circuit disclosed in Patent Document 1.
Figure 10:
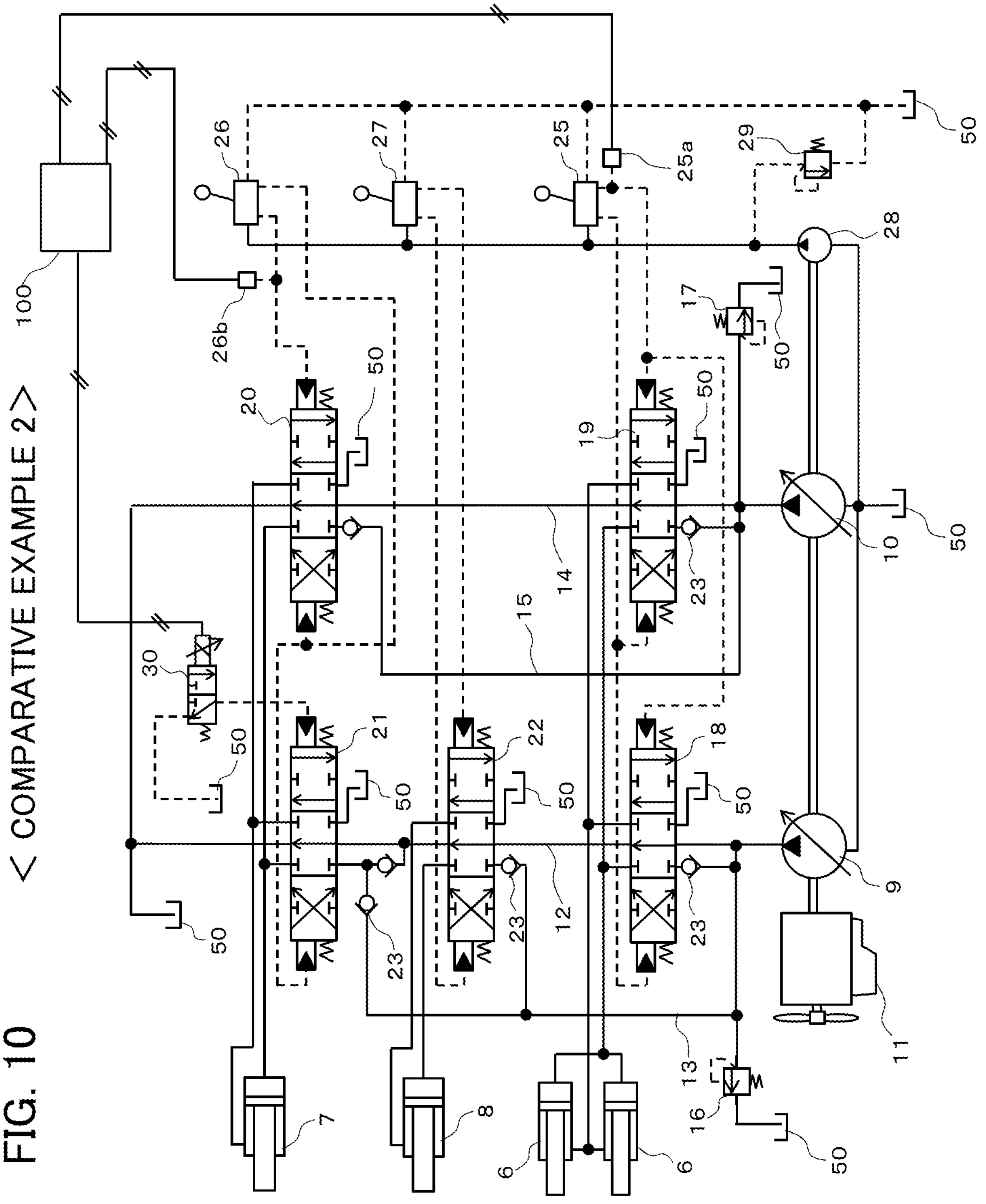
FIG. 10 is a view depicting a hydraulic circuit disclosed in Patent Document 2.

FIG. 9 is a view depicting the hydraulic circuit described in Patent Document 1 (comparative example 1), and FIG. 10 is a view depicting the hydraulic circuit described in Patent Document 2 (comparative example 2).

The hydraulic circuit depicted in FIG. 9 is configured such that a restrictor 24 is provided before an arm second directional control valve 21 of a parallel line 13 such that, even when operation in which the load pressure applied to the arm cylinder 7 is lower than the load pressure applied to the boom cylinder 6 is performed as in the case of horizontal drawing (composite operation of boom raising and arm crowding), the flow of hydraulic fluid to flow into the arm second directional control valve 21 is limited and hydraulic fluid flows preferentially into the boom first directional control valve 18.

In the hydraulic circuit configured in this manner, even where the boom raising operation is gradually decreased to decrease the hydraulic fluid to flow into the boom cylinder 6 in horizontal drawing operation, since the flow rate of the hydraulic fluid to flow into the arm cylinder 7 through the parallel line 13 remains restricted by the restrictor 24, there is the possibility that deterioration of the work efficiency or increase in fuel consumption is caused by hydraulic pressure loss generated at the restrictor 24.

Meanwhile, the hydraulic circuit depicted in FIG. 10 has been invented in order to solve the problem of the hydraulic circuit disclosed in Patent Document 1. The difference from the hydraulic circuit depicted in FIG. 9 resides in that the restrictor 24 of the parallel line 13 is removed and, instead, a solenoid proportional pressure reducing valve 30 is provided before the arm second directional control valve 21 and the arm pilot valve 26 such that the arm second directional control valve 21 is used like a variable opening restrictor to reduce the hydraulic pressure loss generated upon horizontal drawing operation.

In the hydraulic circuit depicted in FIG. 9, when horizontal drawing is performed at a maximum speed (with a maximum arm crowding operation amount), since the center bypass opening of the arm second directional control valve 21 is closed, hydraulic fluid passing through the center bypass opening of the boom first directional control valve 18 flows into the arm cylinder 7 from the arm second directional control valve 21 to increase the arm crowding speed.

On the other hand, in the hydraulic circuit depicted in FIG. 10, since the spool stroke amount of the arm second directional control valve 21 is limited to a fixed amount, even when the arm crowding operation amount is gradually increased during horizontal drawing operation, the center bypass opening of the arm second directional control valve 21 does not fully close. Accordingly, the amount of hydraulic fluid that flows into the arm cylinder 7 from the arm second directional control valve 21 does not increase. In particular, in the hydraulic circuit depicted in FIG. 10, hydraulic fluid delivered from the first hydraulic pump 9 cannot be used fully effectively, and the hydraulic circuit depicted in FIG. 10 has a problem in that it is inferior to the hydraulic circuit depicted in FIG. 9 in terms of the arm crowding speed upon horizontal drawing maximum operation.

In contrast, in the present embodiment, in the hydraulic excavator 200 that includes: the main body including the upper swing structure 1 and the lower track structure 2; the boom 3 pivotably coupled to the main body; the arm 4 pivotably coupled to a distal end portion of the boom 3; the bucket 5 pivotably coupled to a distal end portion of the arm 4; the first hydraulic pump 9; the second hydraulic pump 10; the boom cylinder 6 or the bucket cylinder 8 to which hydraulic fluid is supplied from the first hydraulic pump 9 and the second hydraulic pump 10 to drive the boom 3 or the bucket 5; the arm cylinder 7 to which hydraulic fluid is supplied from the first hydraulic pump 9 to drive the arm 4; the first operation device 25, 27 that issues an instruction on operation of the boom cylinder 6 or the bucket cylinder 8; the second operation device 26 that issues an instruction on operation of the arm cylinder 7; the first directional control valve 18, 22 that controls a direction and a flow rate of hydraulic fluid to be supplied from the first hydraulic pump 9 to the boom cylinder 6 or the bucket cylinder 8 in response to an operation amount of the first operation device 25, 27; the second directional control valve 21 that controls a direction and a flow rate of hydraulic fluid to be supplied from the first hydraulic pump 9 to the arm cylinder 7 in response to an operation amount of the second operation device 26; and the third directional control valve 20 that controls a direction and a flow rate of hydraulic fluid to be supplied from the second hydraulic pump 10 to the arm cylinder 7 in response to an operation amount of the second operation device 26, the first directional control valve 18, 22 and the second directional control valve 21 being tandem connected to the center bypass line 12 of the first hydraulic pump 9 and being connected in parallel to the parallel line 13 branching from the center bypass line 12, the hydraulic excavator 200 including the center bypass flow control valve 31 that is arranged at the most downstream of the center bypass line 12 and limits a flow rate of hydraulic fluid passing through the center bypass line 12 in response to an operation amount of the second operation device 26 in a case where the second operation device 26 is operated, and including the spool stroke limitation device 30, 100 that, in a case where the first operation device 25, 27 and the second operation device 26 are operated simultaneously, limits the spool stroke amount of the second directional control valve 21 in response to the operation amount of the first operation device 25, 27 in a state in which the spool stroke amount of the third directional control valve 20 is controlled in response to the operation amount of the second operation device 26.

Further, in the hydraulic excavator 200 according to the present embodiment, the first operation device 25, 27 includes the boom pilot valve 25 and the bucket pilot valve 27 that reduce delivery pressure of the pilot pump 28 in response to the operation amount of the first operation device 25, 27 and output resulting pressure as operation pressure of the first directional control valve 18, 22, and the second operation device 26 includes the arm pilot valve 26 that reduces delivery pressure of the pilot pump 28 in response to the operation amount of the second operation device 26 and outputs resulting pressure as operation pressure of the second directional control valve 21 and the third directional control valve 20.

Further, the hydraulic excavator 200 according to the present embodiment further includes the pressure sensors 26*b*, 25*a*, 27*a*, and 27*b* that detect the arm crowding operation pressure PIai outputted from the pilot valve 26, the boom raising operation pressure PIbu outputted from the boom pilot valve 25, the bucket crowding operation pressure PIbi outputted from the bucket pilot valve 27, and the bucket dumping operation pressure PIbo outputted from the bucket pilot valve 27, and the spool stroke limitation device 30, 100 includes the first solenoid proportional pressure reducing valve 30 that has the primary pressure port connected to the secondary pressure port on the arm crowding side of the arm pilot valve 26 and the secondary pressure port connected to the operation pressure port 21*a* on the arm crowding side of the second directional control valve 21, and the controller 100 that controls the secondary pressure of the first solenoid proportional pressure reducing valve 30 on the basis of the target meter-in opening area having the lowest value among the target meter-in opening areas of the second directional control valve 21 determined on the basis of the arm crowding operation pressure PIai, the boom raising operation pressure PIbu, the bucket crowding operation pressure PIbi, and the bucket dumping operation pressure PIbo, respectively.

According to the hydraulic excavator 200 according to the present embodiment configured in such a manner as described above, when the second operation device 26 is operated, the flow rate passing through the center bypass line 12 is restricted in response to the operation amount of the second operation device 26. When the first operation device 25, 27 and the second operation device 26 are operated simultaneously, in a state in which the spool stroke amount of the third directional control valve 20 is controlled in response to the operation amount of the second operation device 26, the spool stroke amount of the second directional control valve 21 is limited in response to the operation amount of the first operation device 25, 27. Therefore, the hydraulic pressure loss generated when the plurality of hydraulic actuators 6 to 8 different in load are operated simultaneously is reduced, and consequently, the fuel consumption can be suppressed and besides the work efficient can be improved.

Further, the controller 100 sets the target opening area of the first solenoid proportional pressure reducing valve 30 to a maximum opening area Amax in a case where all of the boom raising operation pressure PIbu, the bucket crowding operation pressure PIbi, and the bucket dumping operation pressure PIbo are equal to or lower than a predetermined pressure PIth. Consequently, when the arm cylinder 7 is driven in operation other than horizontal drawing operation, the spool stroke amount of the arm second directional control valve 21 is not limited, and therefore, hydraulic fluid can be supplied from the first hydraulic pump 9 to the arm cylinder 7 in response to the operation amount of the arm pilot valve 26.

Further, the controller 100 can individually set minimum values Ao, Abu, Abi, and Abo of target meter-in opening areas of the second directional control valve 21, the minimum values being respectively corresponding to the arm crowding operation pressure PIai, the boom raising operation pressure PIbu, the bucket crowding operation pressure PIbi, and the bucket dumping operation pressure PIbo. Consequently, since the meter-in opening characteristic of the arm second directional control valve 21 can be adjusted finely in response to a work to be carried out or to a preference of the operator, the work efficiency can be improved.

Embodiment 2

Figure 3:
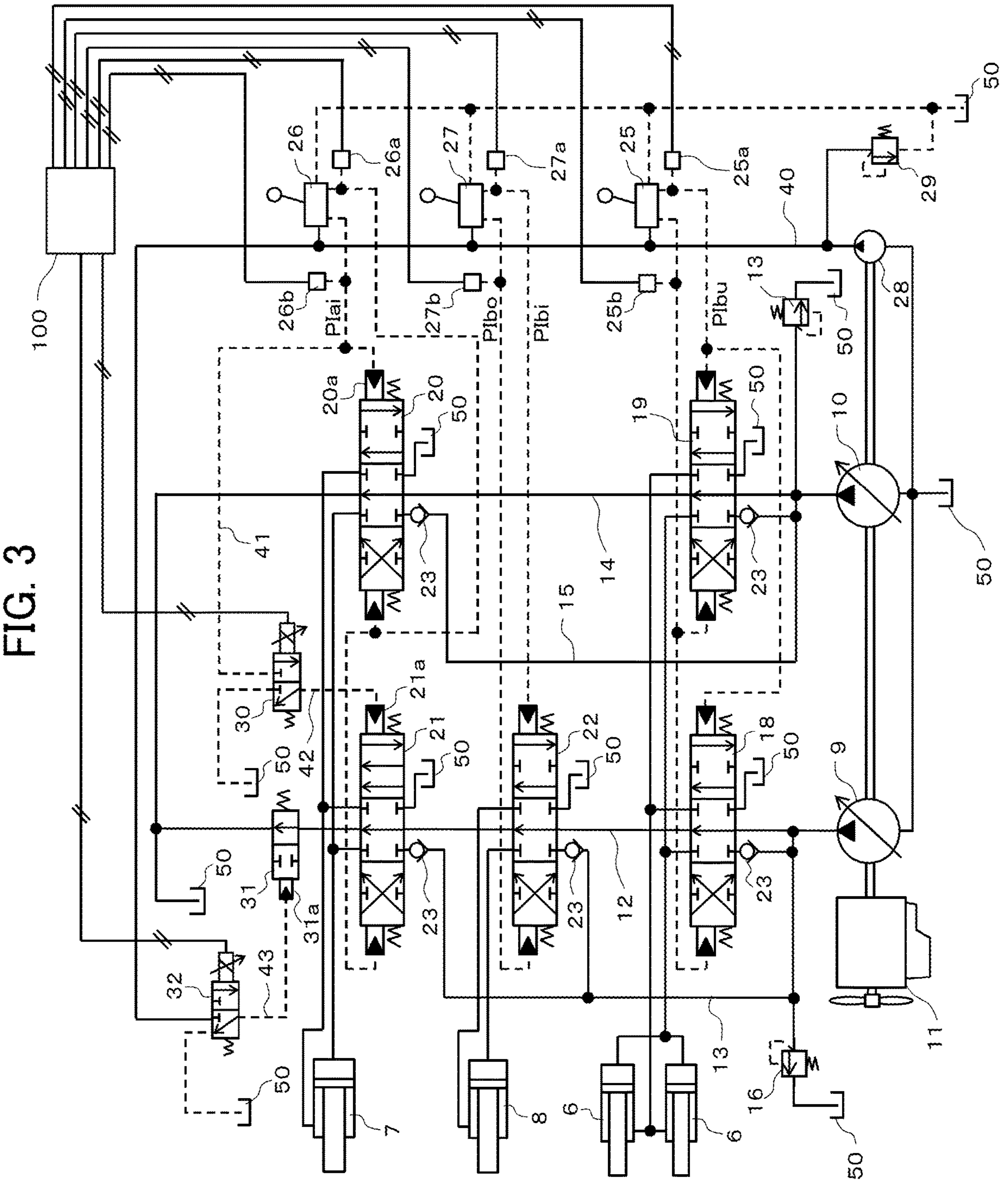
FIG. 3 is a hydraulic circuit diagram of a hydraulic excavator according to a second embodiment of the present invention.

FIG. 3 depicts a hydraulic circuit of the hydraulic excavator 200 according to a second embodiment of the present invention. In the following, differences from the first embodiment are described.

The operation pressure port 31*a* of the center bypass flow control valve 31 is connected to the secondary pressure port of a solenoid proportional pressure reducing valve 32 through a pilot line 43. On the operation pressure port 31*a* of the center bypass flow control valve 31, secondary pressure outputted from the solenoid proportional pressure reducing valve 32 acts. To the primary pressure port of the solenoid proportional pressure reducing valve 32, the delivery line 40 of the pilot pump 28 is connected such that hydraulic fluid delivered from the pilot pump 28 is supplied. Secondary pressure outputted from the solenoid proportional pressure reducing valve 32 is controlled by the controller 100. The controller 100 controls the secondary pressure of the solenoid proportional pressure reducing valve 32 such that the opening characteristic of the center bypass flow control valve 31 coincides with the opening characteristic CB of FIG. 5 on the basis of the arm crowding operation pressure PIai detected by the pressure sensor 26*b*.

The hydraulic excavator 200 according to the present embodiment further includes a second solenoid proportional pressure reducing valve 32 having a primary pressure port connected to the delivery line 40 of the pilot pump 28 and a secondary pressure port connected to the operation pressure port 31*a* of the bypass flow control valve 31. The controller 100 controls the secondary pressure of the second solenoid proportional pressure reducing valve 32 on the basis of a characteristic obtained when the operation pressure depicted in FIG. 5 is set to the arm crowding operation pressure PIai.

According to the hydraulic excavator 200 according to the present embodiment configured in such a manner as described above, not only obtaining advantageous effects similar to those of the first embodiment, but also enabling finely adjustment of the opening characteristic of the center bypass flow control valve 31 at the time of an arm crowding operation in response to a work to be carried out or to a preference of the operator because the center bypass flow control valve 31 is driven by the solenoid proportional pressure reducing valve 32, and thus the work efficiency can be improved.

Although the embodiments of the present invention have been described in detail above, the present invention is not limited to the embodiments described above but includes various modifications. For example, the embodiments described above have been described in detail in order to explain the present invention in an easy-to-understand manner and are not necessarily limited to what includes all configurations described above. Further, also it is possible to add, to the configuration of a certain embodiment, part of the configuration of another embodiment, and also it is possible to delete part of the configuration of a certain embodiment or to replace part of the configuration of a certain embodiment with part of another embodiment.

DESCRIPTION OF REFERENCE CHARACTERS

1: Upper swing structure (main body)
2: Lower track structure (main body)
3: Boom
4: Arm
5: Bucket
6: Boom cylinder
7: Arm cylinder
8: Bucket cylinder
9: First hydraulic pump
10: Second hydraulic pump
11: Engine
12: Center bypass line
13: Parallel line
14: Center bypass line
15: Parallel line
16, 17: Relief valve
18: Boom first directional control valve (first directional control valve)
19: Boom second directional control valve
20: Arm first directional control valve (third directional control valve)
20*a*: Operation pressure port
21: Arm second directional control valve (second directional control valve)
21*a*: Operation pressure port
22: Bucket directional control valve (first directional control valve)
23: Check valve
24: Parallel restrictor
25: Boom pilot valve (first operation device)
25*a*: Pressure sensor
25*b*: Pressure sensor
26: Arm pilot valve (second operation device)
26*a*: Pressure sensor
26*b*: Pressure sensor
27: Bucket pilot valve (first operation device)
27*a*: pressure sensor
27*b*: Pressure sensor
28: Pilot pump
29: Pilot relief valve
30: First solenoid proportional pressure reducing valve (spool stroke limitation device)
31: Center bypass flow control valve
31*a*: Operation pressure port
32: Second solenoid proportional pressure reducing valve
40: Delivery line
41 to 43: Pilot line
50: Hydraulic working fluid tank
100: Controller (spool stroke limitation device)
200: Hydraulic excavator

The invention claimed is:

1. A hydraulic excavator comprising:

a main body including an upper swing structure and a lower track structure;

a boom pivotably coupled to the main body;

an arm pivotably coupled to a distal end portion of the boom;

a bucket pivotably coupled to a distal end portion of the arm;

a first hydraulic pump;

a second hydraulic pump;

a boom cylinder or a bucket cylinder to which hydraulic fluid is supplied from the first hydraulic pump and the second hydraulic pump to drive the boom or the bucket;

an arm cylinder to which hydraulic fluid is supplied from the first hydraulic pump to drive the arm;

a first operation device that issues an instruction on operation of the boom cylinder or the bucket cylinder;

a second operation device that issues an instruction on operation of the arm cylinder;

a first directional control valve that controls a direction and a flow rate of hydraulic fluid to be supplied from the first hydraulic pump to the boom cylinder or the bucket cylinder in response to an operation amount of the first operation device;

a second directional control valve that controls a direction and a flow rate of hydraulic fluid to be supplied from the first hydraulic pump to the arm cylinder in response to an operation amount of the second operation device; and a third directional control valve that controls a direction and a flow rate of hydraulic fluid to be supplied from the second hydraulic pump to the arm cylinder in response to an operation amount of the second operation device, the first directional control valve and the second directional control valve being tandem connected to a center bypass line of the first hydraulic pump and being connected in parallel to a parallel line branched from the center bypass line, the hydraulic excavator including a center bypass flow control valve that is arranged at a most downstream of the center bypass line and limits a flow rate of hydraulic fluid passing through the center bypass line in response to an operation amount of the second operation device in a case where the second operation device is operated, and a spool stroke limitation device that is configured to, in a case where the first operation device and the second operation device are operated simultaneously, limit a spool stroke amount of the second directional control valve in response to an operation amount of the first operation device in a state in which a spool stroke amount of the third directional control valve is controlled in response to an operation amount of the second operation device.

2. The hydraulic excavator according to claim 1, further comprising:

a pilot pump, wherein the first operation device includes a boom pilot valve and a bucket pilot valve that reduce delivery pressure of the pilot pump in response to the operation amount of the first operation device and output resulting pressure as operation pressure of the first directional control valve, and the second operation device includes an arm pilot valve that reduces delivery pressure of the pilot pump in response to the operation amount of the second operation device and outputs resulting pressure as operation pressure of the second directional control valve and the third directional control valve.

3. The hydraulic excavator according to claim 2, further comprising:

pressure sensors that detect arm crowding operation pressure outputted from the arm pilot valve, boom raising operation pressure outputted from the boom pilot valve, bucket crowding operation pressure outputted from the bucket pilot valve, and bucket dumping operation pressure outputted from the bucket pilot valve, wherein the spool stroke limitation device includes a first solenoid proportional pressure reducing valve that has a primary pressure port connected to a secondary pressure port on an arm crowding side of the arm pilot valve and a secondary pressure port connected to an operation pressure port on an arm crowding side of the second directional control valve, and a controller that is configured to control secondary pressure of the first solenoid proportional pressure reducing valve on a basis of a target meter-in opening area having a lowest value among target meter-in opening areas of the second directional control valve, the target meter-in opening areas being determined on a basis of the arm crowding operation pressure, the boom raising operation pressure, the bucket crowding operation pressure, and the bucket dumping operation pressure, respectively.

4. The hydraulic excavator according to claim 3, further comprising:

a second solenoid proportional pressure reducing valve that has a primary pressure port connected to a delivery line of the pilot pump and a secondary pressure port connected to an operation pressure port of the center bypass flow control valve, wherein the controller is configure to control secondary pressure of the second solenoid proportional pressure reducing valve on a basis of the arm crowding operation pressure.

5. The hydraulic excavator according to claim 3, wherein, the controller is configured to set a target opening area of the first solenoid proportional pressure reducing valve to a maximum opening area in a case where all of the boom raising operation pressure, the bucket crowding operation pressure, and the bucket dumping operation pressure are equal to or lower than predetermined pressure.

6. The hydraulic excavator according to claim 3, wherein the controller is capable of individually setting minimum values of a target meter-in opening area of the second directional control value, the minimum values being respectively corresponding to the arm crowding operation pressure, the boom raising operation pressure, the bucket crowding operation pressure, and the bucket dumping pressure.

* * * * *